(12) United States Patent
Sato et al.

(10) Patent No.: US 9,070,380 B2
(45) Date of Patent: Jun. 30, 2015

(54) OBJECTIVE LENS DRIVING APPARATUS, OPTICAL PICKUP

(75) Inventors: Yoshihiro Sato, Yokohama (JP); Jun Hato, Fujisawa (JP); Katsuhiko Kimura, Kasumigaura (JP); Seiichi Kato, Tsuchiura (JP); Takahiro Yamaguchi, Yokohama (JP)

(73) Assignee: HITACHI CONSUMER ELECTRONICS CO., LTD., Kanagawa (JP)

( * ) Notice: Subject to any disclaimer, the term of this patent is extended or adjusted under 35 U.S.C. 154(b) by 302 days.

(21) Appl. No.: 13/015,740

(22) Filed: Jan. 28, 2011

(65) Prior Publication Data
US 2011/0185375 A1 Jul. 28, 2011

(30) Foreign Application Priority Data

Jan. 28, 2010 (JP) ................................. 2010-016135

(51) Int. Cl.
*G11B 7/095* (2006.01)
*G11B 7/09* (2006.01)

(52) U.S. Cl.
CPC ............ *G11B 7/0932* (2013.01); *G11B 7/0935* (2013.01); *G11B 7/0956* (2013.01)

(58) Field of Classification Search
CPC ...... G11B 7/0932; G11B 7/22; G11B 7/0935; G11B 7/0956
USPC .......................... 720/682, 684, 681, 672, 658
See application file for complete search history.

(56) References Cited

U.S. PATENT DOCUMENTS

| 5,734,638 | A  | * | 3/1998  | Matsui ......................... 720/684 |
| 5,781,380 | A  | * | 7/1998  | Berding et al. ............ 360/264.2 |
| 6,160,771 | A  |   | 12/2000 | Kawano et al. |
| 6,377,521 | B1 | * | 4/2002  | Kijima et al. .............. 369/44.23 |
| 6,643,102 | B2 | * | 11/2003 | Matsui et al. .............. 360/271.6 |
| 7,054,235 | B2 | * | 5/2006  | Tsukuda et al. ........... 369/44.15 |

(Continued)

FOREIGN PATENT DOCUMENTS

| JP | 01-260641 | 10/1989 |
| JP | 6-325387  | 11/1994 |

(Continued)

OTHER PUBLICATIONS

Office Action in JP 2010-016135, mailed Apr. 2, 2013 with Corresponding English language Translation of Office Action.

*Primary Examiner* — Julie Anne Watko
(74) *Attorney, Agent, or Firm* — Baker Botts L.L.P.

(57) ABSTRACT

High-performance and reliable objective lens driving apparatus and optical pickup wherein the tilt of an objective lens relative to an optical disc is suppressed are provided. The optical pickup is equipped with a semiconductor laser, an electro-optic component, and the objective lens driving apparatus. In this optical pickup, the objective lens driving apparatus is comprised of: a moving part including an objective lens, a holder that holds the objective lens, a focusing coil, and a tracking coil; a holding member for elastic support members that couples together multiple elastic support members providing elastic support on a fixed part and the moving part and is mounted on the moving part; the elastic support members that elastically support the moving part from the fixed part; and the fixed part. The holding member for elastic support members mounted on the moving part and the holder that holds the objective lens are joined together by fitting together a concavity and a convexity.

8 Claims, 6 Drawing Sheets

(56) References Cited

U.S. PATENT DOCUMENTS

| | | | |
|---|---|---|---|
| 7,227,725 B1* | 6/2007 | Chang et al. | 360/264.2 |
| 7,245,458 B2* | 7/2007 | Zhang et al. | 360/264.2 |
| 7,616,408 B2* | 11/2009 | Choi et al. | 360/264.2 |
| 7,881,016 B2* | 2/2011 | Chang et al. | 360/264.2 |
| 8,040,763 B2* | 10/2011 | Matozaki et al. | 369/44.14 |
| 8,589,967 B2* | 11/2013 | Ochi et al. | 720/686 |
| 2002/0159196 A1* | 10/2002 | Watanabe | 360/264.7 |
| 2003/0002222 A1* | 1/2003 | Abe | 360/264.2 |
| 2003/0043707 A1* | 3/2003 | Jeong | 369/44.16 |
| 2004/0181798 A1* | 9/2004 | Song et al. | 720/684 |
| 2006/0077780 A1* | 4/2006 | Yamada et al. | 369/44.14 |
| 2013/0086600 A1* | 4/2013 | Ochi et al. | 720/681 |

FOREIGN PATENT DOCUMENTS

| | | |
|---|---|---|
| JP | 7-14187 | 1/1995 |
| JP | 07-210883 | 8/1995 |
| JP | 10-289455 | 10/1998 |
| JP | 2001-260641 | 9/2001 |
| JP | 2010-073225 | 4/2010 |

* cited by examiner

OBJECTIVE LENS DRIVING APPARATUS, OPTICAL PICKUP

BACKGROUND OF THE INVENTION

1. Field of the Invention

The present invention relates to an optical pickup that writes and reads information to and from a disc in an optical disc drive or the like and an objective lens driving apparatus equipped with the optical pickup.

2. Description of the Invention

The configuration of the optical disc drive is described below. The optical disc drive is comprised of: a spindle motor for rotating an optical disc; an optical pickup for writing and reading information to and from each optical disc; a feeding mechanism for moving the optical pickup in the direction of the radius of each optical disc; each control circuit that controls the mechanism; and a controller that comprehensively controls regenerative signals from each optical disc and write signals to each optical disc. The optical pickup is a direct mechanism that writes and reads information to and from each optical disc in the above configuration.

Hereafter, description will be given to the operation of the optical disc drive including the optical pickup as a principal component. To read or write information from and to an optical disc, a laser is applied from the optical pickup onto the optical disc loaded into the optical disc drive. The spot of the laser is focused on the data surface of the optical disc and focusing control is carried out. Thereafter, the disc is rotated to carry out data track alignment and tracking control is similarly carried out. Thus optical information on the optical disc is converted into electrical information through the optical pickup and then it is transmitted as data to the controller of the optical disc drive. The optical disc drive receives signals from the optical pickup as mentioned above and transmits and receives data to and from a personal computer or the like.

The optical pickup writes and reads data to and from each optical disc as mentioned above. The objective lens driving apparatus is a mechanism for focusing a laser on each optical disc. The objective lens driving apparatus is comprised of: a holder that holds an objective lens; coils that cause the holder to produce magnetic driving force; a magnet that gives a magnetic field to cause the coils to produce magnetic propulsive force; and an elastic support member for holding the objective lens as a moving part. Three different types of coils are used as the above-mentioned coils: a focusing coil for driving the holder in the direction of the normal to the optical disc surface (this direction will be hereafter referred to as focusing direction); a tracking coil for driving the holder in the direction of the data tracks of each optical disc (this direction will be hereafter referred to as tracking direction); and a tilt coil for tilting the holder toward the direction of the radial direction of the optical disc.

In recent optical discs, their densities have been more and more increased and this is coped with mainly by shortening the wavelength of laser. Optical disc drives are used in personal computers and the like. A shift of personal computers to notebook computers has been accelerated and optical disc drives are also required to be reduced in size. Therefore, also with respect to optical pickups used in optical disc drives, it is indispensable to cope with density growth and yet reduce their thickness. Short-wavelength lasers incorporated in optical pickups provided for high densities are high in sensitivity to aberration due to the relative tilt between an optical disc and an objective lens; therefore, it is necessary to control the relative tilt between the objective lens and the optical disc. The relative tilt between an objective lens and an optical disc is influenced by the positional relation between the above coils and the magnet and an error in the position of supporting the moving part including the objective lens. The following documents describe conventional technologies related to a structure in the position of supporting a moving part including an objective lens:

Patent Document 1 discloses a structure in which an objective lens holding member is provided with a V-shaped groove and a wire is fixed in a gap between it and a retaining member as a different member formed into a V shape.

Patent Document 2 discloses a structure in which a member for holding one elastic support member is configured as a different structure and this member is attached to and fixed on an objective lens holder.

[Patent Document 1] Japanese Unexamined Patent Publication No. Hei 7(1995)-210883 (page 4, FIG. 2)

[Patent Document 2] Japanese Unexamined Patent Publication No. Hei 1(1989)-260641 (page 4, FIG. 2)

In the structure disclosed in Patent Document 1, the elastic support member is clamped by a different member and the elastic support member can be positioned in the focusing direction and the tracking direction. With this structure, however, the direction of the length of the elastic support member is not fixed and a positional error is produced in this direction. When the objective lens is driven, therefore, the support stiffness for the objective lens holder becomes out of balance due to a stiffness difference between elastic support members. As a result, the objective lens is tilted.

In the technology disclosed in Patent Document 2, positioning on the objective lens holder is carried out by a different member attached to the elastic support member. Therefore, the elastic support member can be reliably positioned. However, since only one elastic support member is positioned on the objective lens holder, the following takes place when multiple elastic support members are used: the distance between elastic support members depends on the accuracy of fabrication of the objective lens holder and a different member attached to the elastic support members. Therefore, high fabrication accuracy is required and this is not adequate to price reduction.

Therefore, it is necessary to devise the structure of an objective lens driving apparatus for optical pickups in which when an objective lens is driven, it is possible to suppress the relative tilt between an optical disc and the objective lens and yet stably achieve density enhancement.

SUMMARY OF THE INVENTION

In consideration of the above problem, it is an object of the invention to provide an optical pickup capable of coping with high-density optical discs and thickness reduction.

To achieve the above object, the invention is configured as follows:

(1) An objective lens driving apparatus provided in an optical pickup together with a semiconductor laser and an electro-optic component, the objective lens driving apparatus comprising: a moving part including an objective lens, an objective lens holder holding the objective lens, a focusing coil, and a tracking coil, elastic support members elastically supporting the moving part from a fixed part, and holding members for elastic support members mounted on the moving part, wherein the objective lens holder and the holding members for elastic support members are jointed together by fitting together a concavity and a convexity.

(2) An objective lens driving apparatus provided in an optical pickup together with a semiconductor laser and an electro-optic component, the objective lens driving apparatus comprising: a moving part including an objective lens, an objective lens holder holding the objective lens, a focusing coil, and a tracking coil, elastic support members elastically supporting the moving part from a fixed part, and holding members for elastic support members mounted on the moving part, where in the objective lens holder and the holding members for elastic support members are positioned by a rib formed on the objective lens holder and the contour of the holding member.

(3) The holding member for elastic support members described in Item (1) or (2) above has through holes for the elastic support members and the positional error of the through holes is not more than 1/20 of the distance between through holes.

(4) An optical pickup includes the objective lens driving apparatus described in Item (1) or (2) above.

According to the invention, the multiple elastic support members, not only one elastic support member, can be reliably positioned on the objective lens holder when they are attached there. Therefore, any error in the areas where the elastic support members are fixed can be minimized. This brings the following effect: an objective lens driving apparatus in which when an objective lens is driven, the relative tilt between an optical disc and the objective lens can be suppressed can be obtained. Further, the following effect is obtained by equipping the above-mentioned objective lens driving apparatus in an optical pickup provided for high densities: an optical pickup stable in writing/reading performance can be obtained.

DETAILED DESCRIPTION OF THE PREFERRED EMBODIMENTS

Hereafter, description will be given to embodiments with reference to the drawings.

First Embodiment

Figure 1:
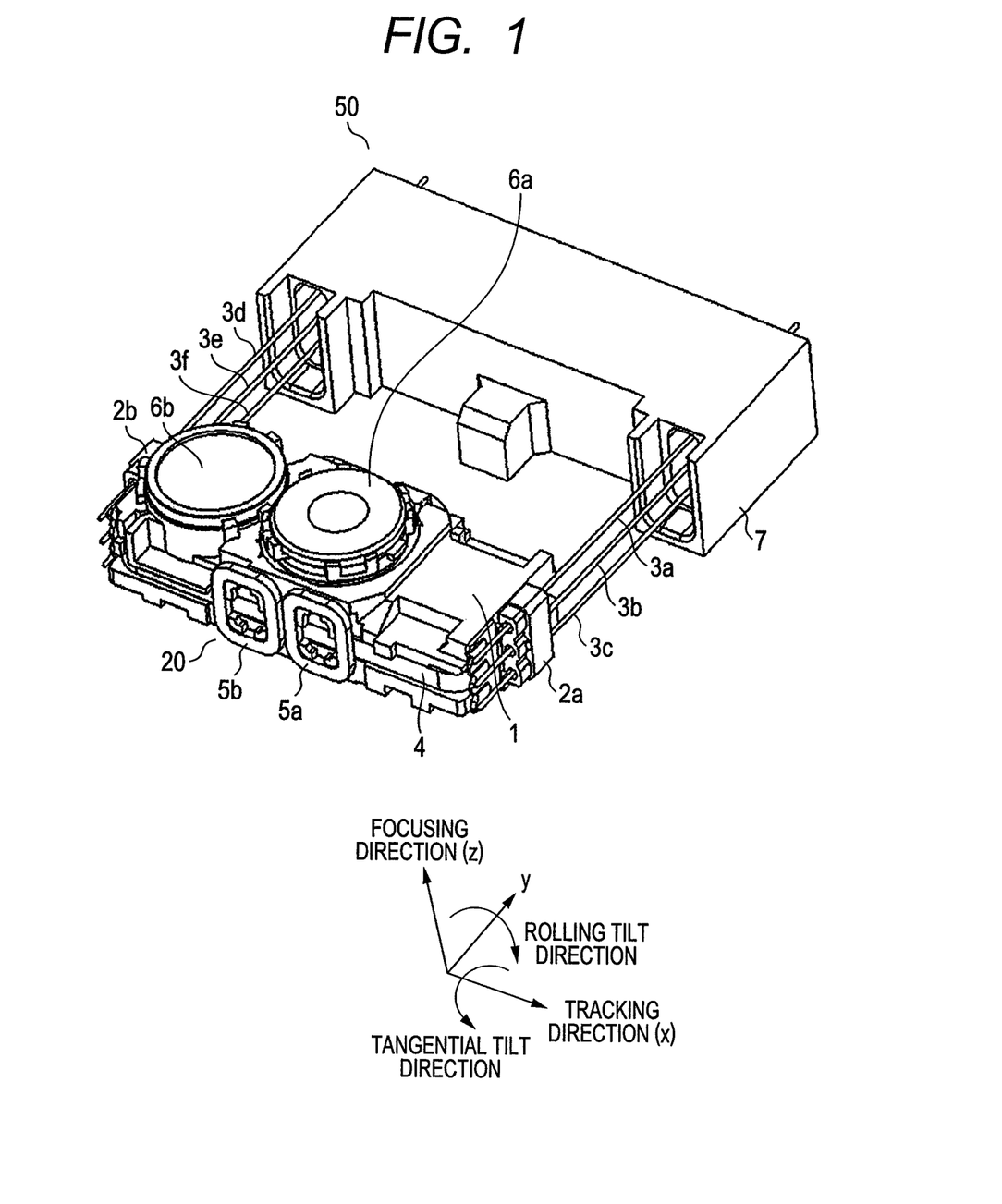
FIG. 1 is a perspective view illustrating an objective lens driving apparatus in a first embodiment of the invention.
Figure 2:
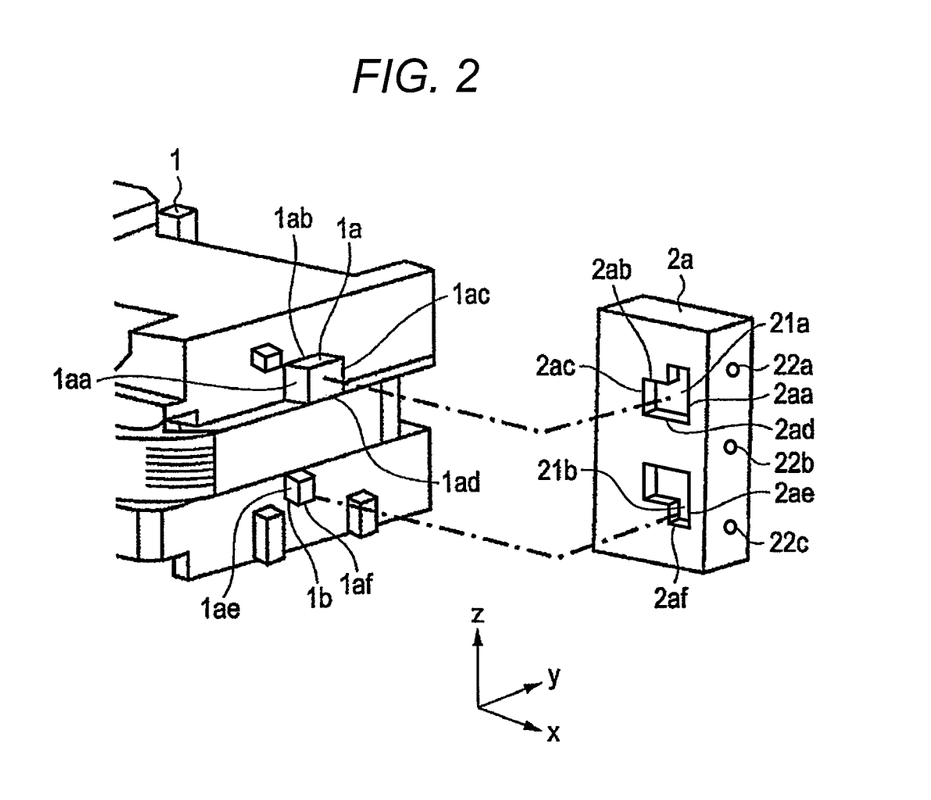
FIG. 2 is a detailed exploded view illustrating a holding member for elastic support members in the first embodiment of the invention.
Figure 3:
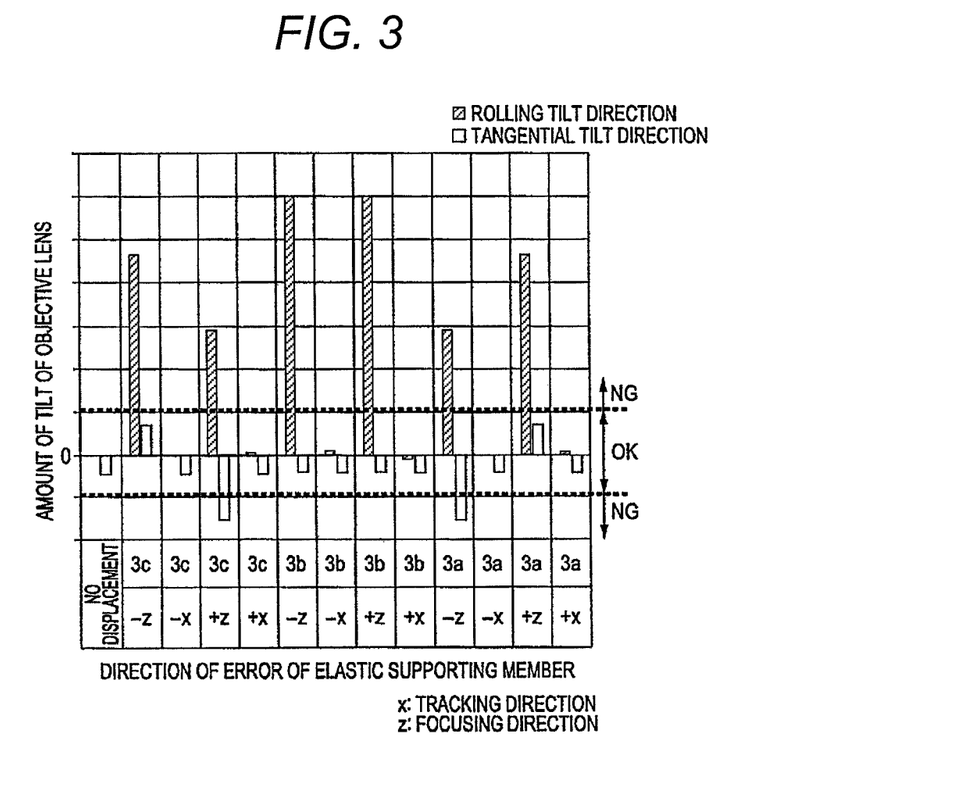
FIG. 3 is a graph indicating the amount of tilt of an objective lens obtained when an error is produced in the fixing positions of elastic support members in the first embodiment of the invention.
Figure 4:
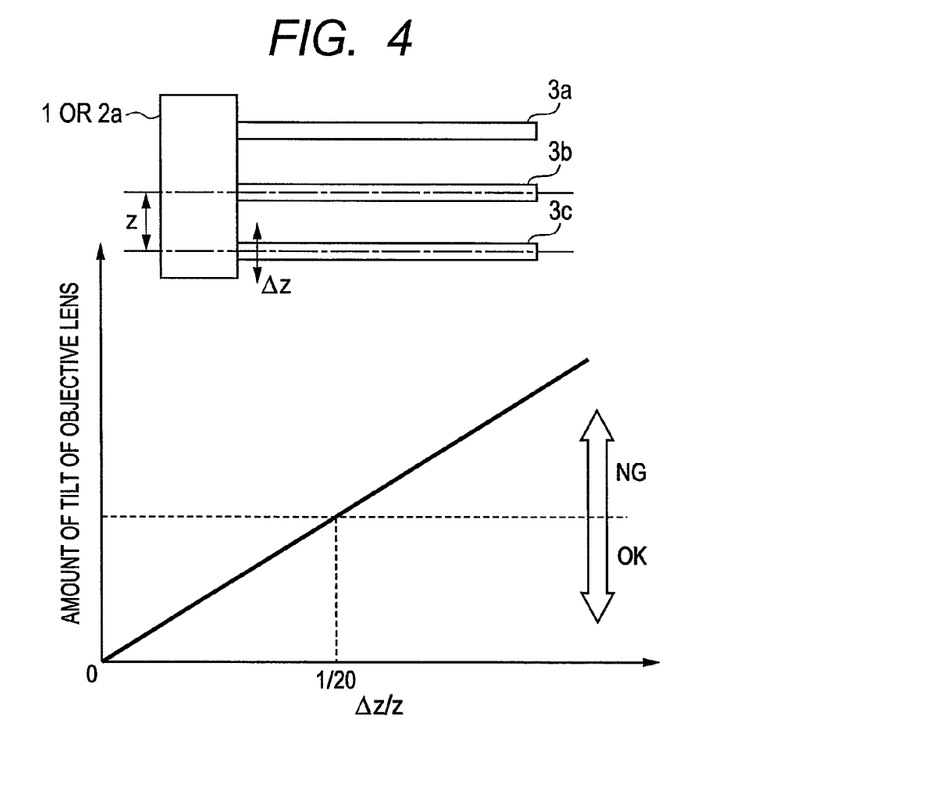
FIG. 4 is a drawing illustrating the amount of tilt of an objective lens versus the ratio of the distance between elastic support members and the amount of error in the elastic support member fixing positions in the first embodiment of the invention.
Figure 6:
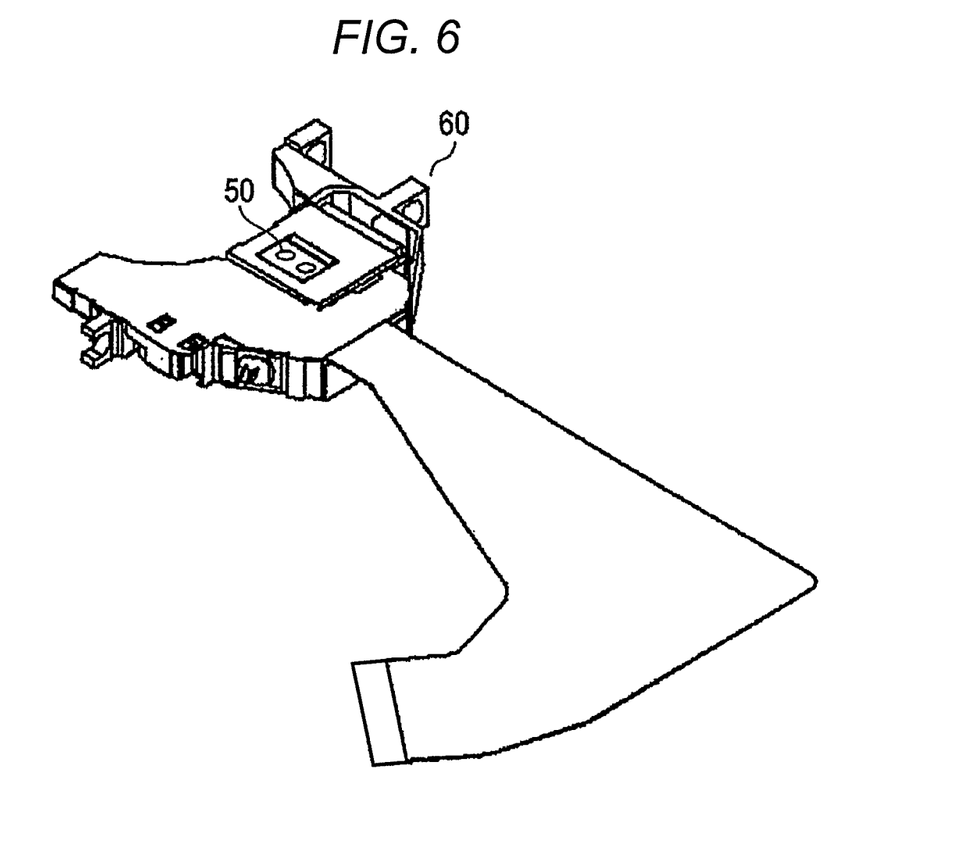
FIG. 6 is a drawing illustrating how an objective lens driving apparatus in an embodiment of the invention is equipped in an optical pickup.
Figure 7:
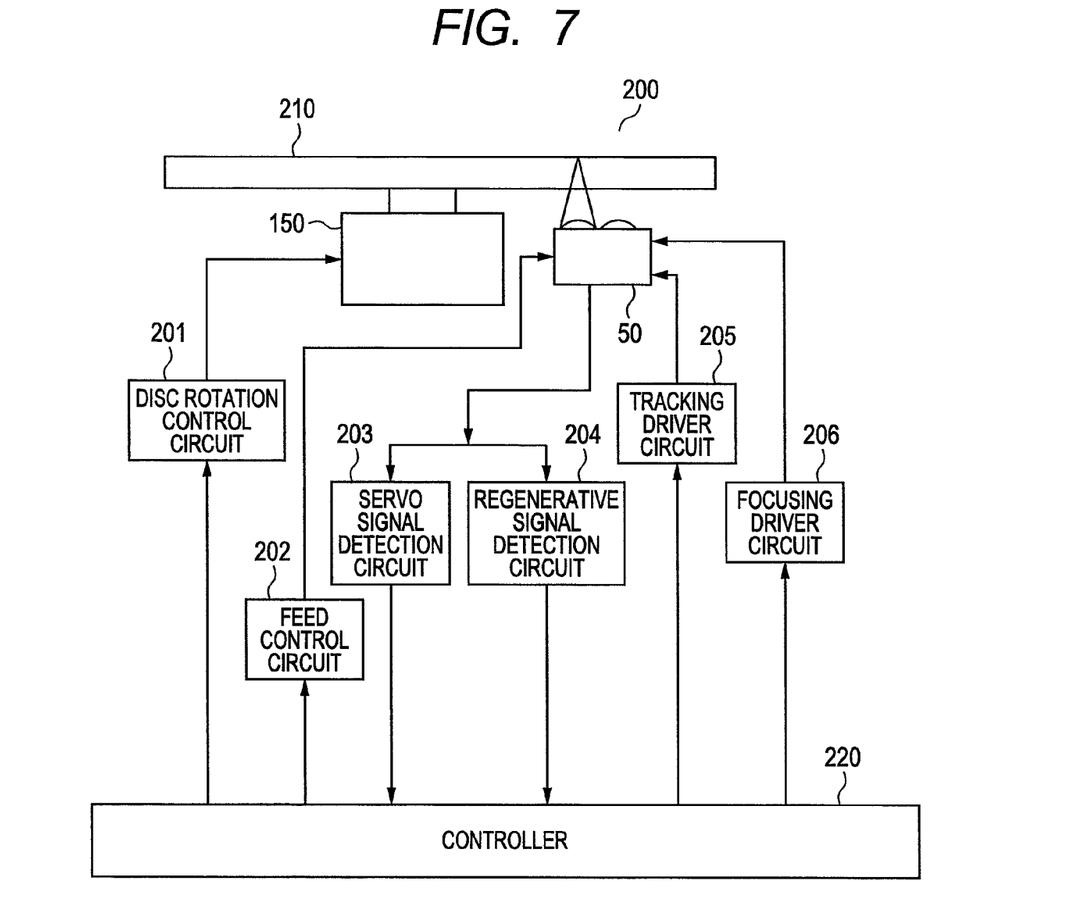
FIG. 7 is a block diagram illustrating the whole of an optical disc drive.

Description will be given to the first embodiment of the invention with reference to FIG. 1, FIG. 2, FIG. 3, FIG. 4, FIG. 6, and FIG. 7. FIG. 1 is a perspective view illustrating an objective lens driving apparatus in this embodiment; FIG. 2 is a detailed exploded view of a holding member for elastic support members in this embodiment; and FIG. 3 is a graph indicating the amount of tilt of the objective lens obtained when an error is produced in elastic support member fixing positions. FIG. 4 illustrates the amount of tilt of the objective lens versus the ratio of the distance between elastic support members to the amount of error in elastic support member fixing positions; FIG. 6 illustrates how the objective lens driving apparatus in this embodiment is equipped in an optical pickup; and FIG. 7 is a block diagram illustrating the whole of an optical disc drive.

This embodiment is characterized in that: the shape of a fit between a member for holding multiple elastic support members and an objective lens holder is so designed that positioning can be carried out in two directions, focusing direction and the direction of the length of each elastic support member.

Description will be given to the operation of an optical disc drive with reference to FIG. 7. To back up data to an optical disc 210 or read data from the optical disc 210, a user loads the optical disc 210 into the optical disc drive 200 equipped in a personal computer or the like. Thereafter, the optical disc 210 is rotated by a disc rotation control circuit 201 installed in a spindle motor 150 for rotational driving. To write or read information to or from the data surface of the optical disc 210, a laser is substantially simultaneously applied from the optical pickup 50 to the optical disc 210 surface. The optical pickup 50 carries out focusing operation so that the laser projected from the objective lens is focused on the optical disc 210 surface. This operation is carried out using a servo signal detection circuit 203 and a focusing driver circuit 206 according to signals from the objective lens driving apparatus and the optical detection circuit equipped in the optical pickup 50. For alignment with a track in the data surface of the optical disc 210, tracking operation is carried out using the servo signal detection circuit 203 and a tracking driver circuit 205 similarly to the focusing operation. When the laser is positioned as mentioned above, the optical disc drive 200 rotates the optical disc at high speed so that a predetermined data transfer rate is obtained. Thus data is generated from regenerative signals from the optical pickup at a regenerative signal detection circuit 204. The data is communicated between the optical disc drive and the personal computer through the controller 220. Control on the optical pickup 50 in the direction of the radius of the optical disc 210 is carried out by a feed control circuit 202. The user manipulates data on the optical disc by the above operation.

The data surface of each optical disc is not always smooth or each data track may be out of round. In addition, when an optical disc is set on the spindle motor in the optical disc drive, the geometrical center of the optical disc does not always agree with the rotation center of the spindle motor. Therefore, when the optical disc is rotated, the data on the optical disc deviates in the out-plane direction and the in-plane direction. This deviation looks like vibration with acceleration as viewed from the optical pickup side. To cause the light spot obtained by focusing a laser to follow this vibration, the objective lens driving apparatus of the optical pickup is equipped with a thrust generation mechanism based on a magnet and a coil. The direction of data vibration in the optical disc out-plane direction is equivalent to the focus direction. With respect to this data vibration, therefore, the coil will be designated as focusing coil. The direction of data track vibration in the optical disc in-plane direction is equivalent to the direction of the radius of the optical disc, that is, the data track direction. With respect to this data track vibration, therefore, the coil will be designated as tracking coil. While data on an optical disc is communicated within the optical disc, the objective lens driving apparatus in the optical pickup constantly applies voltage to each coil to control the light spot. It thereby produces acceleration in the objective lens and drives it to follow the data tracks on the optical disc.

Hereafter, description will be given to the configuration of this embodiment with reference to FIG. 1. Objective lenses 6a, 6b, a focusing coil 4, tracking coils 5a, 5b, and holding members 2a, 2b for elastic support members are attached to an objective lens holder 1 to be a moving part. These elements are driven to produce magnetic thrust in a magnet, not shown, and the focusing coil 4 or the tracking coils 5a, 5b to follow a disc, not shown. Two objective lenses are used to cope both with high-density optical discs and with conventional optical discs. In case of laser wavelength compatible objective lens, one objective lens is used. The focusing coil 4 is so structured that it is wound on the entire objective lens holder to enhance productivity as well as magnetic thrust. To follow a warp in each optical disc in the radial direction, a tilt coil, not shown, may be additionally installed. The thus configured moving part including the objective lenses 6a, 6b is elastically supported. For this purpose, elastic support members 3a to 3f are fixed on the objective lens holder 1 through the holding members 2a, 2b for elastic support members separately provided. To hold the elastic support members 3a, 3b, 3c, the holding member 2a for elastic support members is used; and to hold the elastic support members 3d, 3e, 3f, the holding member 2b for elastic support members is used. Each holding member holds three elastic support members and there are two holding members are provided. Therefore, the objective lens holder 1 is elastically supported by the six elastic support members in total. The other ends of the elastic support members 3a to 3f are fixed on a different fixed part 7. This fixed part 7 is used for coupling with an optical pickup enclosure. The fixed part 7 on which the elastic support members 3a to 3f are fixed may be provided with a damping material or the like to appropriately damp vibration in the moving part including the objective lenses 6a, 6b.

Description will be given to the holding members 2a, 2b for elastic support members that couple together the elastic support members 3a to 3f and the objective lens holder 1, which is a configuration element characteristic of this embodiment. As mentioned above, the focusing coil 4 is series wound on the objective lens holder 1 and thus any of the elastic support members 3a to 3f cannot be directly coupled to the objective lens holder 1. A member for coupling these two components together is separately required. FIG. 3 indicates the trend of tilt of the objective lens 6a or 6b observed when an error is produced in the installation of the elastic support members 3a, 3b, 3c and the objective lens holder 1 is offset in the focusing direction. The installation error directions correspond to the coordinates shown in FIG. 1. Any error in the installation of the elastic support members 3a to 3f on the objective lens holder 1 produces a tilt when the objective lens holder 1 is driven. An error in the distance between elastic support members in the focusing direction has influence on a tilt in the rolling tilt direction and the tangential tilt direction. Any error in the distance between elastic support members in the tracking direction has substantially no influence. In whichever one of the three elastic support members an installation error is produced, it has influence though the type of influence is different. The rate of the positional error $\Delta z$ of each elastic support member in the focusing direction to the distance z between elastic support members 3a, 3b, 3c was determined. FIG. 4 is a graph indicating the result obtained by evaluating the tilt of an objective lens by this index. According to this graph, the requirement for the amount of tilt of an objective lens cannot be met unless the rate of the positional error $\Delta z$ of each elastic support member in the focusing direction to the distance z between elastic support members is equal to or less than 1/20.

In this embodiment, consequently, a structure in which the following measure is taken is adopted to join together the objective lens holder 1 and the elastic support members: the holding members 2a, 2b for elastic support members are provided; three through holes for holding elastic support members are provided in the holding member 2a for the elastic support members 3a, 3b, 3c on one side to keep constant the distance between the elastic support members 3a, 3b, 3c; three through holes for holding elastic support members are provided in the holding member 2b for the elastic support members 3d, 3e, 3f on the other side to keep constant the distance between the elastic support members 3d, 3e, 3f; and when the objective lens holder 1 and the holding member 2a or 2b for elastic support members are fit together, they are positioned by a concavity and a convexity.

The allowable value of error in the distance between through holes for the elastic support members 3a, 3b, 3c or 3d, 3e, 3f in the holding member 2a or 2b for elastic support members is set as mentioned above. That is, the allowable value is set to not more than 1/20 of the distance between through holes.

FIG. 2 illustrates the fitting shape in this embodiment. This drawing illustrates the structure of the peripheral area of the holding member 2a for elastic support members. The objective lens holder 1 and the holding member 2a for elastic support members are positioned by the following: rectangular convexities 1a, 1b formed on the objective lens holder 1; and rectangular concavities 21a, 21b that are formed in the holding member 2a for elastic support members and are to be fit onto the convexities 1a, 1b formed on the objective lens holder 1. In the individual fitting positions, faces 1aa and 2aa, 1ab and 2ab, 1ac and 2ac, 1ad and 2ad, 1ae and 2ae, and 1af and 2af are mated together. The fits obtained by mating together faces 1aa and 2aa, 1ae and 2ae, and 1ac and 2ac are so shaped as to position elastic support members in the direction of length. The fits obtained by mating together faces 1ab and 2ab, 1ad and 2ad, and 1af and 2af are so shaped as to position elastic support members in the focusing directions. These shapes are determined by the accuracy of fabrication of the objective lens holder 1 and the holding member 2a for elastic support members. With respect to the target accuracy in this embodiment, a sufficient accuracy can be achieved by molding.

With respect to the above fitting, it is desirable that the above-mentioned convexities on the objective lens holder 1 and concavities in the holding member 2a for elastic support members should be in the press-fit relation.

After fitting, needless to add, adhesive or the like may be used to reinforce the joint between the objective lens holder 1 and the holding member 2a for elastic support members.

The structure of the peripheral area of the holding member 2b for elastic support members is also configured as mentioned above.

In the above description, a case where the shape of the fit between the objective lens holder 1 and the holding member 2a for elastic support members is rectangular has been taken as an example. The same effect as mentioned above can be obtained even when the convexities are round and the concavities are rectangular. Further, the same effect can also be obtained when the members in which the convexities and the concavities are exchanged.

The objective lens driving apparatus 50 configured as mentioned above is subjected to an adjustment step and then fixed on the optical pickup 60 as illustrated in FIG. 6.

As described up to this point, a high-performance objective lens driving apparatus in which the following can be implemented can be obtained by configuring the objective lens driving apparatus as in this embodiment: the relative tilt between an optical disc and an objective lens can be suppressed even when the objective lens is offset to focus a laser on the optical disc. Further, the following can be implemented by equipping an optical pickup with an objective lens driving apparatus configured as in this embodiment: a high-performance and reliable optical pickup in which deterioration of signals during write or read operation can be minimized is obtained.

Second Embodiment

Figure 5:
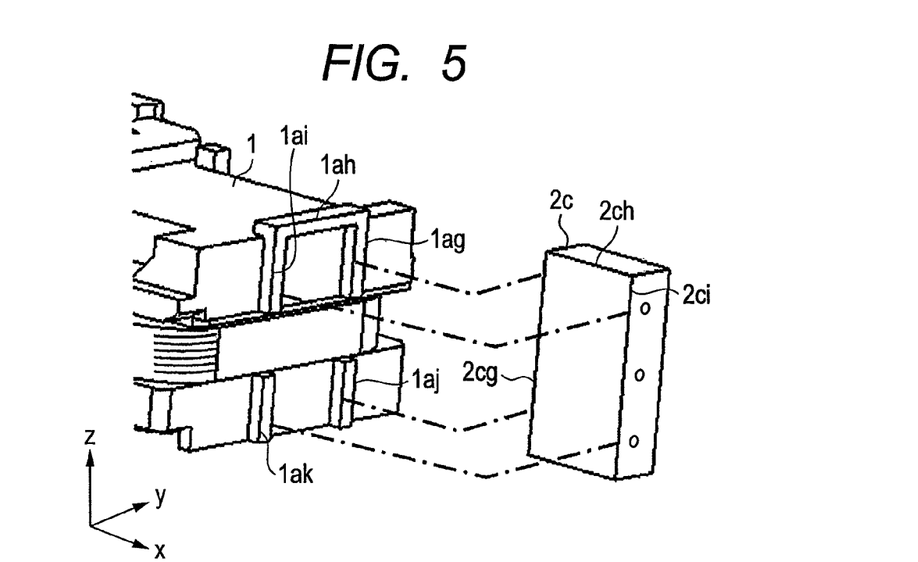
FIG. 5 is a detailed exploded view illustrating a holding member for elastic support members in a second embodiment of the invention.

Description will be given to the second embodiment of the invention with reference to FIG. 1, FIG. 5, FIG. 6, and FIG. 7. FIG. 5 is a detailed exploded view illustrating a holding member for elastic support members in this embodiment. This embodiment of the invention is characterized in that the following structure is adopted to join together the objective lens holder and elastic support members: a holding member is provided and the holding member and the objective lens holder are positioned by a rib formed on the objective lens holder and the contour of the holding member.

The objective lenses 6a, 6b, the focusing coil 4, the tracking coils 5a, 5b, and holding members 2c, 2d for elastic support members are attached to the objective lens holder 1 to be a moving part. The holding members 2c, 2d for elastic support members are identical with the holding members 2a, 2b for elastic support members in the first embodiment illustrated in FIG. 1 in arrangement and functionality. These elements are driven to produce magnetic thrust in a magnet, not shown, and the focusing coil 4 or the tracking coils 5a, 5b to follow a disc, not shown. Two objective lenses are used to cope both with high-density optical discs and with conventional optical discs. In case of laser wave-length compatible objective lens, one objective lens is used. The focusing coil 4 is so structured that it is wound on the entire objective lens holder to enhance productivity as well as magnetic thrust. To follow a warp in each optical disc in the radial direction, a tilt coil, not shown, may be additionally installed. The thus configured moving part including the objective lenses 6a, 6b is elastically supported. For this purpose, elastic support members 3a to 3f are fixed on the objective lens holder 1 through the holding members 2c, 2d for elastic support members separately provided. To hold the elastic support members 3a, 3b, 3c, the holding member 2c for elastic support members is used; and to hold the elastic support members 3d, 3e, 3f, the holding member 2d for elastic support members is used. In this embodiment, six elastic support members are provided and three holding members are configured for each. The other ends of the elastic support members 3a to 3f are fixed on a different fixed part 7. This fixed part 7 is used for coupling with an optical pickup enclosure. The fixed part 7 on which the elastic support members 3a to 3f are fixed may be provided with a damping material or the like to appropriately damp vibration in the moving part including the objective lenses 6a, 6b.

Description will be given to the configuration of this embodiment. FIG. 5 illustrates the fitting shape in this embodiment. This drawing illustrates the structure of the peripheral area of the holding member 2c for elastic support members. In this embodiment, a structure in which the following measure is taken is adopted to join together the objective lens holder 1 and the elastic support members: the holding members 2c, 2d for elastic support members are provided; three through holes for holding elastic support members are provided in the holding member 2c for the elastic support members 3a, 3b, 3c on one side to keep constant the distance between the elastic support members 3a, 3b, 3c; three through holes for holding elastic support members are provided in the holding member 2d, not shown, for the elastic support members 3d, 3e, 3f on the other side to keep constant the distance between the elastic support members 3d, 3e, 3f; and when the objective lens holder 1 and the holding member 2c or 2d for elastic support members are fit together, they are positioned by the shape of a rib on the objective lens holder 1 and the contour of the holding member 2c or 2d for elastic support members.

Further, the allowable value of error in the distance between through holes for the elastic support members 3a, 3b, 3c or 3d, 3e, 3f in the holding member 2c or 2d for elastic support members is set as described in relation to the first embodiment. That is, the allowable value is set to not more than 1/20 of the distance between through holes.

The objective lens holder 1 and the holding member 2c for elastic support members are positioned by taking the following measure: the holding member 2c for elastic support members is fit into the rib 1ag, 1ah, 1ai, 1aj, 1ak formed on the objective lens holder 1. In the individual fitting positions, the rib portion 1ah and the holding member portion 2ch, the rib portions 1ai and 1ak and the holding member portion 2ci, and the rib portions 1ag and 1aj and the holding member portion 2cg are respectively mated together. The fits obtained by mating together the rib portions 1ai and 1ak and the holding member portion 2ci and the rib portions 1ag and 1aj and the holding member portion 2cg are so shaped as to position elastic support members in the direction of the length. The fit obtained by mating together the rib portion 1ai and the holding member portion 2ch is so shaped as to position elastic support members in the focusing direction. These shapes are determined by the accuracy of fabrication of the objective lens holder 1 and the holding member 2a for elastic support members. With respect to the target accuracy in this embodiment, a sufficient accuracy can be achieved by molding. In this embodiment, further, the above object can be achieved by the accuracy of the outer dimensions of the holding members for elastic support members and thus the cost of a forming die is not increased.

With respect to the above fitting, it is desirable the above mentioned rib formed on the objective lens holder 1 and the contour of the holding member 2c for elastic support members should be in the press-fit relation.

After fitting, needless to add, adhesive or the like may be used to reinforce the joint between the objective lens holder 1 and the holding member 2c for elastic support members. The structure of the holding member 2d for elastic support members for holding the elastic support members 3d, 3e, 3f is also configured as mentioned above.

The objective lens driving apparatus 50 configured as mentioned above is subjected to an adjustment step and then fixed on the optical pickup 60 as illustrated in FIG. 6.

As described up to this point, a high-performance and inexpensive objective lens driving apparatus in which the following can be implemented can be obtained by configuring the objective lens driving apparatus as in this embodiment: the relative tilt between an optical disc and an objective lens can be suppressed even when the objective lens is offset to focus a laser on the optical disc. Further, the following can be implemented by equipping an optical pickup with an objective lens driving apparatus configured as in this embodiment:

a high-performance and reliable optical pickup in which deterioration of signals during write or read operation can be minimized is obtained.

What is claimed is:

1. An objective lens driving apparatus configured to be provided in an optical pickup together with a semiconductor laser and an electro-optic component, the objective lens driving apparatus comprising:
    an objective lens holder including an objective lens, a focusing coil for driving the objective lens holder in a focusing direction, and a tracking coil for driving the objective lens holder in a driving direction;
    a fixed part;
    a plurality of elastic support members, each including a first end and a second end, and configured for elastically supporting the objective lens holder from the fixed part, and
    holding members mounted on the objective lens holder, each of the holding members being configured for holding the plurality of elastic support members,
    wherein the respective first ends of the plurality of elastic support members are held by the holding members and fixed at respective fixing positions to the objective lens holder by the holding members,
    wherein the respective second ends of the plurality of elastic support members are fixed to the fixed part, and,
    wherein each of the holding members is joined together with the objective lens holder by fitting together first and second pairs each comprised of a concavity and a convexity, the pairs being spaced from one another in the focusing direction, each pair of one of the concavities and one of the convexities having together first mating faces shaped so as to position the fixing positions of the elastic support members in the length direction thereof and second mating faces shaped so as to position the fixing positions of the elastic support members in the focusing direction.

2. The objective lens driving apparatus according to claim 1, wherein the holding member for elastic support members has a plurality of through holes for the elastic support members, and
    wherein the positional error of the through holes is equal to or less than 1/20 of the distance between through holes.

3. An optical pickup equipped with the objective lens driving apparatus according to claim 1.

4. The objective lens driving apparatus according to claim 1, wherein each of the holding members holds three elastic support members.

5. An objective lens driving apparatus configured to be provided in an optical pickup together with a semiconductor laser and an electro-optic component, the objective lens driving apparatus comprising:
    an objective lens holder including an objective lens, a focusing coil for driving the objective lens holder in a focusing direction, and a tracking coil for driving the objective lens holder in a driving direction;
    a fixed part;
    a plurality of elastic support members, each including a first end and a second end, and configured for elastically supporting the objective lens holder from the fixed part, and
    holding members mounted on the objective lens holder, each of the holding members being configured for holding the plurality of elastic support members,
    wherein the respective first ends of the plurality of elastic support members are held by the holding members and fixed at the respective fixing positions to the objective lens holder by the holding members,
    wherein the respective second ends of the plurality of elastic support members are fixed to the fixed part, and,
    wherein each of the holding members is positioned on the objective lens holder by a plurality of ribs formed on the objective lens holder and a plurality of contours of the holding member, the ribs and the contours having together first mating faces shaped so as to position the fixing positions of the elastic support members in the length direction thereof and second mating faces shaped so as to position the fixing positions of the elastic support members in the focusing direction.

6. The objective lens driving apparatus according to claim 5,
    wherein the holding member for elastic support members has a plurality of through holes for the elastic support members, and
    wherein the positional error of the through holes is equal to or less than 1/20 of the distance between through holes.

7. An optical pickup equipped with the objective lens driving apparatus according to claim 5.

8. The objective lens driving apparatus according to claim 5, wherein each of the holding members holds three elastic support members.

* * * * *